United States Patent [19]

Mautner et al.

[11] Patent Number: 5,281,657
[45] Date of Patent: Jan. 25, 1994

[54] PROCESS FOR PREPARING ORGANOPOLYSILOXANE HYDROSOLS

[75] Inventors: Konrad Mautner, Burgkirchen; Bernward Deubzer, Burghausen; Helmut Oswaldbauer, Stubenberg-Furstberg; Hilmar Sinner, Burghausen, all of Fed. Rep. of Germany

[73] Assignee: Wacker-Chemie GmbH, Munich, Fed. Rep. of Germany

[21] Appl. No.: 106,973

[22] Filed: Aug. 16, 1993

Related U.S. Application Data

[63] Continuation of Ser. No. 796,969, Nov. 25, 1991, abandoned.

[30] Foreign Application Priority Data

Dec. 28, 1990 [DE] Fed. Rep. of Germany ....... 4042141

[51] Int. Cl.$^5$ ............................ C08K 5/01; C08K 5/41
[52] U.S. Cl. ..................... 524/745; 524/837; 524/858; 524/860; 524/861; 528/23; 528/34; 252/312; 106/287.14
[58] Field of Search ................ 528/34, 23; 524/837, 524/745, 858, 860, 861; 252/312; 106/287.14

[56] References Cited

U.S. PATENT DOCUMENTS 4,482,670 11/1984 Saam et al. ..................... 524/860
4,857,582 8/1989 Wolfgruber et al. .............. 524/858
5,049,636 9/1991 Wolfgruber et al. .............. 528/33
5,064,894 11/1991 Desmenceau et al. ............. 524/837

FOREIGN PATENT DOCUMENTS 0195936 10/1986 European Pat. Off.
0202679 11/1986 European Pat. Off.
0335414 10/1989 European Pat. Off.

*Primary Examiner*—John C. Bleutge
*Assistant Examiner*—Karen A. Dean

[57] ABSTRACT

A process for preparing organopolysiloxane hydrosols by mixing an organosilicon compound with water, which comprises mixing a silane of the formula $$R_aSi(OR^1)_{4-a} \qquad (I)$$

where a is 0, 1, 2 or 3, R can be the same or different and is a hydrogen atom or a monovalent organic radical, $R^1$ can be the same or different and is a monovalent organic radical, and/or a partial hydrolysis product thereof and, optionally, an organodisiloxane of the formula $$R^2_3Si\text{-}O\text{-}SiR^2_3 \qquad (II)$$

where $R^2$ can be the same or different and is the same as R, with water in the presence of an emulsifier at a temperature below 15° C.

12 Claims, No Drawings

PROCESS FOR PREPARING ORGANOPOLYSILOXANE HYDROSOLS

This application is a continuation of U.S. patent application Ser. No. 07/796,969, filed Nov. 25, 1991, now abandoned.

The invention relates to a process for preparing organopolysiloxane hydrosols and to the use thereof.

BACKGROUND OF THE INVENTION

Many processes are known for preparing organopolysiloxane hydrosols. References which disclose processes for preparing organopolysiloxane hydrosols are, for example, U.S. Pat. No. 3,433,780 (issued Mar. 18, 1969, J. Cekada, Jr. and D. R. Weyenberg, Dow Corning Corporation) and U.S. Pat. No. 4,424,297 (issued Jan. 3, 1984, A. E. Bey, Dow Corning Corporation). These publications describe the preparation of colloidal suspensions of organosilsesquioxanes having an average particle size of from 10 to 100 nm, in which trialkoxysilanes are added with agitation to a mixture of water and surface-active agents, the quantity of the added trialkoxysilanes being less than about 10 percent by weight, based on the total weight of trialkoxysilane, water and surface-active agents, or the rate of addition being less than 10 mol of trialkoxysilane per liter per hour. Furthermore, German Offenlegungsschrift 3,717,075 (M. Wolfgruber, Wacker-Chemie GmbH, issued Dec. 8, 1988) or the corresponding U.S. Pat. No. 4,857,582 discloses a continuous process for preparing colloidal suspensions of organopolysiloxanes which are built up from at least two different siloxane units, such as monoorganosiloxane units, diorganosiloxane units and triorganosiloxane units as well as $SiO_{4/2}$ units, in which the organosilicon compound and water are separately fed into a reactor, at a rate of at most 5 mol per hour of organosilicon compound per liter of water.

It is an object of the present invention to provide a process for preparing organopolysiloxane hydrosols in a relatively simple manner.

SUMMARY OF THE INVENTION

The foregoing object and others which will become apparent from the following description are accomplished in accordance with this invention, generally speaking, by providing a process for preparing organopolysiloxane hydrosols by mixing an organosilicon compound with water, which comprises mixing a silane of the formula $$R_a Si(OR^1)_{4-a} \quad (I),$$

where a is 0, 1, 2 or 3, R which can be the same or different and is a hydrogen atom or a monovalent organic radical and $R_1$ which can be the same or different and is a monovalent organic radical, and/or a partial hydrolysis product thereof and, optionally, an organodisiloxane of the formula $$R^2{}_3Si\text{-}O\text{-}SiR^2{}_3 \quad (II)$$

where $R^2$ be the same or different and is the same as R, with water in the presence of an emulsifier at a temperature below 15° C.

DESCRIPTION OF THE INVENTION

In the silane of the formula, radical R is preferably a hydrogen atom or a monovalent hydrocarbon radical having from 1 to 9 carbon atom(s), and substituted monovalent hydrocarbon radicals in which the substituents are inert to water.

Examples of hydrocarbon radicals represented by the radical R are alkyl radicals such as the methyl, ethyl, n-propyl, isopropyl, n-butyl, iso-butyl, tert-butyl, n-pentyl, iso-pentyl, neopentyl or tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical; alkenyl radicals such as the vinyl and allyl radicals; cycloalkyl radicals such as the cyclopentyl, cyclohexyl, cycloheptyl and methylcyclohexyl radicals; aryl radicals such as the phenyl radical; alkaryl radicals such as o-, m- and p-tolyl radicals, xylyl radicals and ethylphenyl radicals; aralkyl radicals such as the benzyl radical and the α- and β-phenylethyl radicals.

Examples of substituted hydrocarbon radicals represented by the radical R are halogenated hydrocarbon radicals such as the chloromethyl, 3-chloropropyl, 3-bromopropyl, 3,3,3-trifluoropropyl and 5,5,5,4,4,3,3-heptafluoropentyl radicals, and the chlorophenyl, dichlorophenyl and trifluorotolyl radicals; mercaptoalkyl radicals such as the 2-mercaptoethyl and 3-mercaptopropyl radicals; cyanoalkyl radicals such as the 2-cyanoethyl and 3-cyanopropyl radicals; aminoalkyl radicals such as the 3-aminopropyl, N-(2-aminoethyl)-3-aminopropyl and N-(2-aminoethyl)-3-amino-(2-methyl)-propyl radicals; aminoaryl radicals such as the aminophenyl radical; acyloxyalkyl radicals such as the 3-acryloxypropyl and 3-methacryloxypropyl radicals; hydroxyalkyl radicals such as the hydroxypropyl radical; and radicals of the formula

Preferably, the radical R is a hydrogen atom or a methyl, vinyl, 3-chloropropyl or 3-mercaptopropyl radical, especially the methyl or vinyl radical.

The radical $R^1$ is preferably an alkyl group having from 1 to 6 carbon atom(s), which can be substituted by alkyloxy groups or hydroxyl groups.

Preferably, the $R^1$ radicals are the alkyl radicals mentioned for R, having 1 to 6 carbon atom(s), and the methoxyethylene and ethoxyethylene radicals.

Preferably, a is 1 or 2, and more preferably an average of from 1.0 to 1.5 and most preferably 1.

The silanes of formula (I), used in the process of this invention, are preferably methyltrimethoxysilane, vinyltrimethoxysilane, 3-mercaptopropyltrimethoxysilane, 3-chloropropyltrimethoxysilane, hydrogen-triethoxysilane, dimethyldiethoxysilane and dimethyldimethoxysilane with methyltrimethoxysilane and vinyltrimethoxysilane being the preferred silanes.

The silanes of formula (I), used in the process of this invention, can be a single species of such silanes or also a mixture of at least two different species of such silanes.

If a partial hydrolysis product of the silane of formula (I) is used in the process of this invention, the partial hydrolysis product preferably has at most 5 silicon atoms per molecule.

In the process of this invention, the silane of formula (I) and/or the partial hydrolysis product thereof is used in an amount preferably up to about 40 percent by weight, and more preferably in an amount of from 20 to 30 percent by weight, based on the weight of water employed.

Examples of the $R^2$ radicals are the same examples as indicated for the radical R, in which $R^2$ is preferably a methyl or vinyl radical.

Examples of an organodisiloxane, which may be employed are hexamethyldisiloxane, tetramethyldihydrogendisiloxane and tetramethyldivinyldisiloxane.

If an organodisiloxane is used, it is preferably a hexamethyldisiloxane or a tetramethyldivinyldisiloxane.

If an organodisiloxane is used, it is preferably employed in an amount up to about 10 percent by weight, and more preferably up to about 5 percent by weight, based on the total amount of silane employed.

The organodisiloxane used in the process of this invention, if any, can be an individual species of such an organodisiloxane or it can also be a mixture of at least two different species of such an organodisiloxane.

The required emulsifiers used in the process of this invention comprise carboxylic acids having from 9 to 20 carbon atoms, aliphatically substituted benzenesulfonic acids having at least 6 carbon atoms in the aliphatic substituents, aliphatic-substituted napthalenesulfonic acids having at least 4 carbon atoms in the aliphatic substituents, aliphatic sulfonic acids having at least 6 carbon atoms in the aliphatic substituents, silylalkylsulfonic acids having at least 6 carbon atoms in the alkyl substituents, aliphatic-substituted diphenyl ether-sulfonic acids having at least 6 carbon atoms in the aliphatic substituents and alkyl hydrogen sulfates having at least 6 carbon atoms in the alkyl substituents.

Preferably, the anionic emulsifiers used are those whose aliphatic substituents contain at least 8, and more preferably 12 carbon atoms. Specific examples of aliphatic substituents are octyl, decyl, dodecyl, cetyl, stearyl, myricyl, oleyl, nonenyl, octynyl, phytyl, and pentadecadienyl radicals. Aliphatically substituted benzenesulfonic acids are the preferred anionic emulsifiers.

In the process of this invention, the emulsifier is preferably used in an amount of from 0.5 to 30 percent by weight, and more preferably in an amount of from 2 to 5 percent by weight, based on the total weight of organosilicon compound employed.

The emulsifier used in the process of this invention can be an individual species and also a mixture of at least two different species of such an emulsifier.

In addition to the silane of formula (I), the partial hydrolysis product thereof, optionally an organodisiloxane, emulsifier and water, up to 30 percent by weight, based on the total weight of organosilicon compound employed, of additional components such as, for example, neutral surfactants, protective colloids and thickeners can be used in the process of this invention.

Examples of neutral surfactants are fatty acid ethoxylates such as, for example, $(EO)_m$-stearates with m being equal to 8 to 100, fatty alcohol ethoxylates such as, for example, stearyl-, lauryl-, cetyl-, oleyl- and isotridecyl-$(EO)_z$ with z being equal to 2 to 100, and ethoxylated alkylphenols such as, for example. octyl- and nonylphenol-$(EO)_n$ with n being equal to 4 to 30.

Examples of protective colloids are polyvinyl alcohols.

Examples of thickeners are polyacrylates.

In the process of this invention, the individual components can be mixed with one another in any desired manner.

In the process of this invention, the mixing of the silane of formula (I) and/or the partial hydrolysis product thereof, water, emulsifier, and optionally organodisiloxane and additional components is carried out at a temperature below 15° C., preferably below 5° C., the temperature just above the solidification point, at which the predominant part of the mixture according to the invention is still just liquid, being regarded as the lower limit. The lower temperature limit here is preferably a temperature of around 0° C. Preferably, the mixing is carried out under the pressure of the surrounding atmosphere, that is to say between 900 and 1100 hPa. However, it can also be carried out at higher or lower pressures. Preferably, the mixture thus obtained is kept at a temperature below 15° C., preferably below 5° C., for a period of preferably from 30 minutes to 9 hours. Subsequently thereto, it is advantageous to remove the resulting compound of the formula $R^1OH$—preferably an alkanol—with $R^1$ being the same as above. If the resulting compound of formula $R^1OH$ with $R^1$ being the same as above, is removed, it is sufficient to let the resultant mixture stand at a temperature below 15° C, preferably below 5° C., for a period of 30 minutes to 5 hours.

In the process of this invention, water is preferably introduced first into a reactor, which can be fitted with a device for cooling the reactor contents, and the silane of formula (I) and/or the partial hydrolysis product thereof is added. A mixing device is generally not necessary, but it can of course be used. The silane of formula (I) and/or the partial hydrolysis product thereof is fed in at such a rate that the temperature of the resulting mixture is below 15.C, preferably below 5° C. This can be accomplished, for example, by controlling the feed rate of the silane of formula (I) and/or of the partial hydrolysis product thereof by means of a temperature sensor and/or by first introducing a part of the water employed in the form of ice. The emulsifier, the organodisiloxane if used and any additional components employed can then be added either individually or as a mixture with the water or together with the silane of formula (I) employed according to this invention. The emulsifier is preferably first introduced as a mixture with the water into the reactor, the organodisiloxane being added as a mixture with the silane of formula (I) and the additional components being introduced with water and emulsifier.

In a preferred embodiment of the process of this invention, a mixture containing water and emulsifier is first introduced into a reactor at a temperature below 5° C. and the silane of formula (I) and/or the partial hydrolysis product thereof, and if appropriate as a mixture with organodisiloxane, is added, during which the temperature of the mixture thus obtained should not exceed 5° C. This mixture is then kept at a temperature below 5° C. for an additional 30 minutes to 2 hours and, subsequently thereto, the resulting compound of the formula $R^1OH$ - preferably an alkanol, in which $R^1$ is the same as above, is removed by distillation. This is preferably carried out at a temperature between 15 and 30° C. and under a pressure of between 15 and 100 hPa. Thin-film evaporators, for example, are suitable for this purpose.

The process of this invention is carried out under acidic conditions, preferably in the range from pH 1.5 to pH 3.0.

In the process of this invention, colloidal aqueous dispersions of organopolysiloxanes composed of units of the formula $$R^3{}_xSiO_{(4-x)/2} \quad (III)$$

are prepared, where $R^3$ which can be the same or different and is the same as R, and x is equal to 0, 1, 2 or 3, with an average of from 0.9 to 2.1. The examples given above for the radical R also represent examples of the radical $R^3$.

Even though not shown by formula (III), up to 5 mol percent of the radicals $R^3$ can be replaced in the organopolysiloxanes by radicals —$OR^4$, where $R^4$ is the same as the definitions for $R^1$.

The organopolysiloxane hydrosols prepared according to the invention have an average particle diameter of from 10 to 500 nm, preferably from 20 to 250 nm, and more preferably from 20 to 150 nm, and a solids content of organopolysiloxanes of up to 20 percent by weight, and more preferably from 10 to 15 percent by weight, based on the total weight of the organopolysiloxane hydrosol. The maximum possible solids content in the hydrosol depending on the SiC-bonded organic radicals in the organopolysiloxanes is about 20 percent by weight.

The process of this invention has the advantage that reproducible organopolysiloxane hydrosols can be prepared in a simple manner which has a narrow and monodispersed particle size distribution. It is possible to vary the particle size especially by means of a suitable choice of the temperature. The hydrosols of organopolysiloxanes of this invention have, furthermore, the advantage that they are storage-stable. By the expression "storage-stable" we mean that the hydrosols can be stored for at least 12 months, without noticeable precipitation occurring.

The hydrosols prepared according to the invention can be used directly for many applications, but the organopolysiloxanes contained therein can, if desired, be isolated from the hydrosol in any conceivable manner, for example by the addition of a salt, precipitation by polar solvents or evaporation of the water.

The hydrosols of organopolysiloxanes, prepared according to this invention can be used for impregnating and coating purposes, for example for imparting hydrophobic protection to buildings or in the treatment of paper and textiles. Furthermore, transparent resin films, which are not redispersible, or organopolysiloxanes which consist of $R^3SiO_{3/2}$ and $R^3{}_2SiO_{2/2}$ units or of $SiO_{4/2}$ and $R^3{}_2SiO_{2/2}$ units, in which $R_3$ is the same as defined above, can be produced from the hydrosols of this invention by removing the water at room temperature and under a pressure of between 900 and 1100 hPa or under reduced pressure or at elevated temperature.

The hydrosols of this invention consist of organopolysiloxanes having $R^3SiO_{3/2}$ units, in which $R^3$ is the same as defined above, are especially suitable as textile finishing agents for waterproofing and fiber stabilization, as a waterproofing constituent for protecting building products and in blends with rubber latices for introducing colloidal particles as active reinforcing fillers.

The hydrosols of this invention, consisting of organopolysiloxanes are also suitable as a grafting base for grafting thermoplastics such as, for example, polyvinyl chloride, polyvinyl acetate, polyvinyl methacrylate and polystyrene, which are polymerizable in water by a free-radical mechanism. Particularly preferred in this case are hydrosols of organopolysiloxanes which consist of $R^3SiO_{3/2}$ and $R^3{}_2SiO_{2/2}$ units, in which $R^3$ has one of the above definitions, and furthermore, have elastomeric properties.

In the following examples, all parts and percentages are by weight, unless otherwise specified. The following examples are carried out under a pressure of the surrounding atmosphere, that is under about 1000 hPa, unless otherwise stated. The term "room temperature" is to be understood as a temperature of 20° C.

EXAMPLE 1

A mixture containing 270 g of methyltrimethoxysilane and 30 g of vinyltrimethoxysilane is added in one portion to a mixture containing 750 g of ice, 699 g of water and 51 g of dodecylbenzenesulfonic acid (10 percent in water). The resultant mixture is warmed to room temperature and maintained for 4 hours at room temperature. This gives a milky-white organopolysiloxane hydrosol having particle sizes, determined by electron microscopy, of 60 nm with a monodispersed particle size distribution and a solids content of 8.3 percent, based on the total weight of the hydrosol. The organopolysiloxane hydrosol is storage-stable, which means that no noticeable precipitation occurred even after storage for 12 months, and on evaporation of the water at room temperature and under the pressure of the surrounding atmosphere it leaves a resin powder which is not redispersible.

EXAMPLE 2

The procedure described in Example 1 is repeated except that, after the mixing step, the resulting mixture is not warmed to room temperature, but is maintained for a period of 2 hours at a temperature of 0° C. and, subsequently thereto, the methanol formed is distilled off in a thin-film evaporator (50 hPa/30° C.). This gives a clear organopolysiloxane hydrosol having particle sizes, determined by electron microscopy, of 24 nm with a monodispersed particle size distribution and a solids content of 10 percent, based on the total weight of the hydrosol. The organopolysiloxane hydrosol is storage-stable, which means that no noticeable precipitation occurred even after storage for 12 months, and on evaporation of the water at room temperature and under the pressure of the surrounding atmosphere it leaves a resin powder which is not redispersible.

EXAMPLE 3

The procedure described in Example 1 is repeated except that, after the mixing step, the resulting mixture is not warmed to room temperature but is kept for a period of 9 hours at a temperature of 0° C. This gives a clear organopolysiloxane hydrosol having particle sizes, determined by electron microscopy, of 25 nm with a monodispersed particle size distribution and a solids content of 8.3 percent, based on the total weight of the hydrosol. The organopolysiloxane hydrosol is storage-stable, which means that no noticeable precipitation occurred even after storage for 12 months, and on evaporation of the water at room temperature and under the pressure of the surrounding atmosphere it leaves a resin powder which is not redispersible.

EXAMPLE 4

About 56 g of methyltrimethoxysilane are added in one portion to a mixture containing 100 g of ice, 91.6 g of water and 8.4 g of dodecylbenzenesulfonic acid (10 percent in water). The resultant mixture is maintained for a period of 2 hours at a temperature of 3° C. and, subsequently thereto, the methanol formed is distilled off in a thin-film evaporator (50 hPa/30° C.). this gives a milky-white organopolysiloxane hydrosol having particle sizes, determined by electron microscopy, of 120 nm with a monodispersed particle size distribution and a solids content of 14 percent, based on the total weight of the hydrosol. The organopolysiloxane hydrosol is storage-stable, which means that no noticeable precipitation occurred even after storage for 12 months, and on evaporation of the water at room temperature and room temperature and under the pressure of the surrounding atmosphere it leaves a resin powder which is not redispersible.

EXAMPLE 5

A mixture containing 40.3 g of dimethyldimethoxysilane and 0.5 g of hexamethyldisiloxane is added in one portion to a mixture containing 125 g of ice, 125 g of water and 2.5 g of dodecylbenzenesulfonic acid (10 percent in water). The resultant mixture is maintained for a period of 30 minutes at a temperature of 0° C. and, subsequently thereto, the methanol formed is distilled off in a thin-film evaporator (15 hPa/15° c.). This gives a milky-white organopolysiloxane hydrosol having particle sizes, determined by electron microscopy, of 109 nm with a monodispersed particle size distribution and a solids content of 7.5 percent, based on the total weight of the hydrosol. The organopolysiloxane hydrosol is storage-stable, which means that no noticeable precipitation occurred even after storage for 12 months, and on evaporation of the water at room temperature and under pressure of the surrounding atmosphere it leaves a dimethylpolysiloane oil having a viscosity of 48 mPa.s (20° C.).

EXAMPLE 6

The procedure described in Example 5 is repeated except that, instead of the mixture of 40.3 g of dimethyldimethoxysilane and 0.5 g of hexamethyldisiloxane, a mixture containing 4 g of methyltrimethoxysilane and 72.5 g of dimethyldimethoxysilane is used. This gives an opalescent organopolysiloxane hydrosol having particle sizes, determined by electron microscopy, of 53 nm with a monodispersed particle size distribution and a solids content of 9.1 percent, based on the total weight of the hydrosol. The organopolysiloxane hydrosol is storage-stable, which means that no noticeable precipitation occurred even after storage for 12 months, and on evaporation of the water at room temperature and under the pressure of the surrounding atmosphere it leaves a soft, elastic film.

EXAMPLE 7

A mixture containing 1449 g of water and 51 g of dodecylsulfonic acid (10 percent in water) is cooled by means of cryostat with an immersion cooler at 0.C in an insulated glass vessel. Over a period of 4 minutes, 300 g of methyltrimethoxysilane are pumped into this mixture, the cooling rate of the cryostat being selected such that the temperature of the mixture thus obtained does not exceed a temperature of 3° C. The mixture is then kept for a period of 2 hours at a temperature of 0° C. and, subsequently thereto, the methanol formed is distilled off in a thin-film evaporator (50 hPa/30° C.). This gives a clear organopolysiloxane hydrosol having particle sizes, determined by electron microscopy, of 23 nm with a monodispersed particle size distribution and a solids content of 10.6 percent, based on the total weight of the hydrosol. The organopolysiloxane hydrosol is storage-stable, which means that no noticeable precipitation occurred even after storage for 12 months, and on evaporation of the water at room temperature and under the pressure of the surrounding atmosphere it leaves a brittle resin powder which is not redispersible.

COMPARATIVE EXPERIMENT 1

About 56 g of methyltrimethoxysilane are added in one portion at a temperature of 20° C. to a mixture containing 191.6 g of water and 8.6 g of dodecylbenzenesulfonic acid (10 percent in water). During this addition, the clear mixture thus obtained warms to 50° C. After the mixture has been allowed to stand for one hour, the sol formation starts and, after about an additional 30 minutes, precipitation occurred which greatly increased over a period of 30 minutes.

What is claimed is:

1. A process for preparing organopolysiloxane hydrosols, which comprises reacting a mixture containing a silane of the formula $$R_a Si(OR^1)_{4-a} \qquad (I)$$

where a is 0, 1, 2 or 3, R is a hydrogen atom or a monovalent organic radical, $R^1$ is a monovalent organic radical, and/or a partial hydrolysis product thereof and, optionally, an organodisiloxane of the formula $$R^2{}_3Si\text{-}O\text{-}SiR^2{}_3 \qquad (II)$$

where $R^2$ is the same as R, and water in the presence of an emulsifier at a temperature below 5° C. under acidic conditions.

2. The process of claim 1, wherein the reaction mixture is maintained at a temperature below 5° C. for a period of 30 minutes to 9 hours.

3. The process of claim 1, wherein a compound having the formula $R^1OH$ is distilled from the reaction mixture, in which $R^1$ is a monovalent organic radical.

4. The process of claim 2, wherein a compound of the formula $R^1OH$ is distilled from the reaction mixture, in which $R^1$ is a monovalent organic radical.

5. The process of claim 1 wherein the water and emulsifier are first introduced into a reactor at a temperature below 5° C. and the silane of formula (I) and/or a partial hydrolysis product thereof, and optionally in admixture with an organodisiloxane, is added, while maintaining the temperature of the resultant mixture below about 5° C. for 30 minutes to 5 hours under acidic conditions and, thereafter a compound having the formula $R^1OH$ is distilled from the resultant mixture, in which $R^1$ is a monovalent organic radical.

6. The process of claim 2 wherein the water and emulsifier are first introduced into a reactor at a temperature below 5° C. and the silane of formula (I) and/or a partial hydrolysis product thereof, and optionally in admixture with an organodisiloane, is added, while maintaining the temperature of the resultant mixture below about 5° C. for 30 minutes to 5 hours under acidic conditions and, thereafter a compound having the formula $R^1OH$ is distilled from the resultant mixture, in which $R^1$ is a monovalent organic radical.

7. The process of claim 1, wherein the reaction is carried out in a pH range of from 1.5 to 3.0.

8. The process of claim 2, wherein the reaction is carried out in a pH range of from 1.5 to 3.0.

9. The process of claim 5, the reaction is carried out in a pH range of from 1.5 to 3.0.

10. The process of claim 1, wherein the radical R in formula (I) is selected from the group consisting of a hydrogen atom, a methyl radical, a vinyl radical, a 3-chloropropyl radical and a 3-mercaptopropyl radical.

11. The process of claim 1, wherein the organodisiloxane is selected from the group consisting of hexamethyldisiloxane and tetramethyldivinyldisiloxane.

12. The process of claim 5, wherein the organodisiloxane is selected from the group consisting of hexamethyldisiloxane and tetramethyldivinyldisiloxane.

* * * * *

UNITED STATES PATENT AND TRADEMARK OFFICE
CERTIFICATE OF CORRECTION

PATENT NO. : 5,281,657

DATED : January 25, 1994

INVENTOR(S) : Konrad Mautner, Bernward Deubzer, Helmut Oswaldbauer and Hilmar Sinner It is certified that error appears in the above-identified patent and that said Letters Patent is hereby corrected as shown below:

In Claim 1, column 8, line 24, change "(i)" to --- (I) ---.

Signed and Sealed this

Nineteenth Day of July, 1994

Attest:

BRUCE LEHMAN

Attesting Officer     Commissioner of Patents and Trademarks